Patented Feb. 21, 1933

1,898,345

UNITED STATES PATENT OFFICE

PAUL S. DENNING, OF JOLIET, ILLINOIS, ASSIGNOR TO FREDERIC E. SCHUNDLER, OF JOLIET, ILLINOIS

PROCESS OF COLORING GRANULAR AND OTHER MATERIAL

No Drawing.    Application filed May 31, 1929.    Serial No. 367,625.

This invention relates to colored granules and other material, and to the process of coloring the same.

One of the objects of the invention is the provision of a new and improved method of coloring granular and other material whereby the intensity and uniformity of the color of the resulting product can be controlled.

Another object of the invention is the provision of a new and improved method of coloring granular and other material whereby the resulting product will have the desired color tint permanently applied to the material and the process will be performed in such a manner that the normal brilliancy of the color will not be impaired during the operation.

A further object of the invention is the provision of new and improved means for holding the color pigment uniformly suspended in the binding material while the same is being applied to the granules, thereby insuring uniformity of color distribution.

In the coloring of building and other material, especially in the coloring of granules, it is common practice to treat the material with sodium silicate in which coloring matter has been incorporated and then fix the color by baking or heating the material to a temperature above the fusing point of the sodium silicate. This process is objectionable because, while the silicate in fused condition will react on the material that is being coated to form an insoluble binder, it will also react on certain of the color pigments with unfavorable results.

In any event, the color pigment, on being heated to the fusing point of sodium silicate will lose its brilliancy and intensity, and the resulting color of the material will be greatly impaired.

It has also been proposed to treat granular material with a solution of sodium silicate in which coloring pigment has been incorporated without subsequently fixing the silicate by heating or by treating it with a substance with which it will chemically react to form an insoluble compound, and while the coloring pigment will retain its freshness and brilliancy of color when treated in this manner, the color will not be permanent, especially if exposed to the elements because of the solubility of the silicate which will be gradually dissolved and the pigment washed away by rain, snow and the like.

The present invention seeks to apply the color pigment exteriorly to the surface of the material by means of a soluble agent, and then to treat this agent with a composition that will chemically react with it to form an insoluble compound for permanently fixing the pigment to the material.

For the purpose of disclosing the invention, the process will be described as applicable to granular building material, although it is understood the invention contemplates the coloring of objects other than granular building material.

In carrying out the process, after the stone has been reduced to granular form and cleaned to remove dust, dirt and other foreign matter adhering to the surface thereof, the granules are treated with a solution of a soluble silicate such as potassium or sodium silicate, in which pigment of the desired color has been incorporated. The use of sodium silicate is prefered because of its commercial advantage.

Great difficulty has heretofore been experienced in obtaining uniformity in the coloring of granules and other material, due to the fact that the color pigment tends to settle out of the composition before it can be applied to the surface of the granules. I have found by experiment that by the use of a finely divided material added to the solution it will materially assist in holding the color pigment in suspension evenly distributed throughout the solution. Preferably a finely divided material having colloidal properties is employed for this purpose, such for instance as china clay, bentonite and other colloidal clays. Preferably bentonite, which has an extremely high percentage of colloidal matter, is employed, because a smaller amount can be used than of china clay or of other clays not having such pronounced colloidal properties. Peptized material, such as peptized Kaolin may also be employed for this purpose, if desired.

It has been found by experiment that bentonite and compounds of similar nature are best suited for this purpose, which is probably due to the fact that they are of finer grain or texture, or have a higher percentage of colloidal matter, than other materials that may be used for this purpose.

In performing this part of the process the pigment and bentonite are ground together in a dry state in a ball mill in the proportions in which they are to be used.

After the grinding operation the color pigment and bentonite mixture are added to water in proportion to make a smooth paste.

In the practical operation of the process the mixture of coloring material and bentonite should be added gradually to the water and not the water to the mixture, in order to prevent conglomeration of the coloring matter and bentonite.

After being mixed to a smooth paste, a solution of silicate of soda is added, preferably of a specific gravity of 40° Baumé. The best results are obtained by the use of silicate of soda approximately of the formula $NA_2O, 3SiO_2$, although those of a different formula give good results. These materials are then thoroughly mixed in a suitable mixer.

This mixture or a proportionate part thereof, depending on the amount of granular material to be used in the batch, is then added to a batch of the dry granular material and the whole mixed until the granules are uniformly coated.

After being mixed, the material is heat treated in a furnace, preferably with a temperature as low as 250° to 300° F., during the early stages of the treatment, and then preferably raised to 500° or 600° F. during the remainder of the time, the mass being agitated in the meantime to prevent conglomeration of the granules. The agitation is only necessary during the sticky stage, which lasts but a few minutes. It is desirable not to agitate the granules after the coating is past the sticky stage because it will tend to chip or wear off the sodium silicate and the color pigment.

The temperature is kept proportionately low during the early stages of the agitation in order to insure keeping the granules from adhering to each other. It is absolutely necessary in performing this heat treating step of the operation that the temperature be kept below the fusing point of the sodium silicate, otherwise the coloring matter will be injured and its freshness and brilliancy impaired.

The heat treatment at this stage of the process is extremely important for the reason that if the granules be permitted to dry at room temperature the sodium silicate appears to assume a state in which, when subsequently treated with the fixing composition, it will not firmly secure the coloring material to the granules, and consequently this coloring matter will be mechanically removed by the action of the elements when exposed thereto.

The mass is then treated with a solution that will react on the sodium silicate to form an insoluble compound. Any suitable compound such as calcium chloride or magnesium chloride, aluminum sulphate and the like, that will chemically react on the sodium silicate to form an insoluble silicate, may be employed for this purpose. If calcium or magnesium chloride, for instance, be employed, a solution of approximately 6° Baumé is preferably used.

The mass may then be agitated in order to thoroughly wet all the parts. The material is then dried and in order to hasten the drying operation it may be heated. It is only necessary that the temperature be high enough to drive off the water with the speed desired. 300° F. is usually ample. The material, however, may be dried at room temperature if desired.

The granules are now in condition for use. It has been found by experiment that a saving in the amount of coloring matter may be effected if the process be now repeated or duplicated. When the process is repeated more satisfactory results are obtained because after the first process is completed there will be more or less free fixing compound on the surface, and this will assist in reacting on the silicate during the repetition of the process so that on the second application the silicate coating will be chemically reacted on from both its inner and outer sides.

Where the process is repeated a much smaller proportionate amount of the coloring matter is employed, thus materially reducing the cost of manufacture, because of the high cost of the coloring matter and the low cost of repeating the process.

For imparting to each ton of the granular material a green color, the following approximate proportions by weight for constituting the first coat, when the process is not repeated, give excellent results:

6 to 10 pounds chromic oxide
    7 pounds bentonite
    56 pounds water and after these ingredients have been mixed to a smooth paste, as described above, 90 pounds of silicate of soda at 40° Baumé is added. After the silicate has been added and the whole thoroughly mixed, the mixture should be about the consistency of thick cream.

After this mixture has been applied to the granules and properly dried, as described above, the coated granules are treated with a 6° Baumé solution of some salt that will react on the sodium silicate to convert the same into an insoluble compound which, if calcium or magnesium chloride be employed, will require from 80 to 160 pounds.

Where the process is to be duplicated, the amounts of materials employed remain substantially the same for each operation except that the coloring pigment may be greatly reduced. In the above amounts the chromic oxide may be reduced to as low as three pounds and with the duplicate process the resultant granules will have the brilliancy and intensity of those of the single process where ten pounds of the chromic oxide has been employed, thus effecting a saving of four pounds of material or of 40% of the cost of the coloring matter of the single process.

Since the coloring matter and the bentonite are not reacted upon by the other elements the amounts employed may vary within wide limits. The amount of sodium silicate and the strength of the solution may also vary considerably. It has been found, for instance, that a solution of sodium silicate as low as 20° Baumé and as high as 42° Baumé may be successfully employed.

I am aware that is has been proposed to color stone walls and the like by first coating the same with a solution of sodium silicate mixed with color pigment, permitting the same to dry at atmospheric temperature, and then treating the coated surface with a soluble chloride solution that will react on the silicate to form an insoluble silicate. Such a process is unsatisfactory because where the first coat is dried at atmospheric temperature the same appears to be more or less spongy or flocculent and even after being treated with the chloride and dried, it is readily mechanically removed by the action of the elements.

The present invention contemplates the application of the coloring matter to granules, maintaining the identity or separation of the granules by agitation and by applying the coloring matter to the granules with the proper heat treatment, insuring permanency in the adherence of the coloring matter to the granules without in any way impairing the luster or brilliancy of the colors.

This is a continuation-in-part of my application Serial No. 264,970 filed March 26, 1928, which has since become abandoned.

Having thus described the invention, what I claim is:

1. The process of coloring mineral granules which includes the steps of coating the granules while at substantially atmospheric temperature with a solution of a pigment and a soluble silicate, drying the material at a temperature materially above that of the atmosphere and below the fusing point of the silicate, and subjecting the coated granules to a solution of a metallic salt capable of chemical reaction with the silicate to produce an insoluble silicate.

2. The process of coloring mineral granules which includes the steps of coating the granules with a solution of a pigment, a soluble silicate, and an ingredient constituting a medium for suspending the pigment, heating the coated granule to a temperature between 300° F. and 500° F. and subjecting the coated granules to a solution of a metallic salt capable of chemical reaction with the silicate to produce an insoluble silicate of the corresponding metal and finally drying the granule.

3. The process of coloring mineral granules which includes the steps of coating the granules with a solution of a pigment, bentonite, and a soluble silicate, subjecting the coated granules to heat below 500° F. and thereafter to action of a solution of a metallic salt capable of chemical reaction with the silicate to produce an insoluble silicate.

4. The process of coloring mineral granules which includes the steps of coating the granules while at substantially atmospheric temperature with a solution of a pigment and a soluble silicate, agitating the mass in the presence of heat below the fusing point of said silicate but above that of boiling water and subjecting the coated granules to a solution of a metallic salt capable of chemical reaction with the silicate to produce an insoluble silicate of the corresponding metal and finally drying the granules.

5. The process of coloring mineral granules which includes the steps of coating the granules while not materially above room temperature with a solution of a pigment and a soluble silicate, drying the granules at a temperature above 300° F. but below the fusing point of the soluble silicate, subjecting the coated dried granules to a solution of a metallic salt capable of chemical reaction with the silicate to produce an insoluble silicate of the corresponding metal, and subjecting the coated granules to a drying temperature sufficiently high to drive off the water.

6. The process of coloring mineral granules which includes the steps of coating the granules while not materially above room temperature with a solution of pigment, a soluble silicate, and bentonite, agitating the mass in the presence of heat above 300 degrees Fahrenheit but below the fixing point of the silicate, subjecting the coated granules to a solution of a metallic salt capable of chemical reaction with the silicate to produce an insoluble silicate of the corresponding metal, and subjecting the coated granules to a drying temperature.

7. The process of coloring granules which comprises coating the granules with a coloring pigment and a soluble compound, agitating the mass in the presence of heat above 250° F., but below the fusing point of said soluble compound, then subjecting the coated granules to a solution of a soluble compound capable of reacting with said first-named compound to form an insoluble compound, and then drying the granules.

8. As an article of manufacture, colored granules composed of a core of stone and a coating of colored material having the brilliancy and other properties of colored granules that have been made by coating the same while not materially above room temperature with a soluble silicate in which a colored pigment has been incorporated, heating the mass above 300° F., but below the fusing point of the silicate, then treating the coated granules with metallic soluble chloride and then drying the granules.

In testimony whereof I affix my signature.

PAUL S. DENNING.